Patented Jan. 1, 1929.

1,697,266

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF CRACKING AND OXIDIZING OILS.

No Drawing. Original application filed January 3, 1922, Serial No. 526,655. Divided and this application filed October 13, 1924. Serial No. 743,453.

This invention relates to a method of producing gasoline and other hydrocarbons from petroleum and also various products of oxidation which are derived from the union of oxygen with the products of cracking heavier oils.

The invention is concerned not only with the production of gasoline by cracking an oil but also the oxidation of some part of the products of cracking particularly the unsaturated components as for example the olefins or other unsaturated substances produced by the cracking of heavy oils such as petroleum oil, asphalt, gilsonite, fats and greases and the like. While the invention has many modifications and the sources of raw material are varied the process will be described by means of the use of oil gas as an illustrative procedure. While the treatment of cracked material will be more specifically set forth below, the processes of oxidation therein disclosed are equally applicable to the treatment of uncracked petroleum oils.

For this purpose heavy petroleum oil, first purified by means of a desulphurizing agent, may be dropped into a heated pan and allowed to become volatilized, the gases and vapors being passed through an elongated strongly heated retort or cracking tube so as to yield a high percentage of lighter hydrocarbons including unsaturated bodies. In some cases these may constitute a very substantial portion of the fixed gases or very light constituents as for example twenty-five to forty per cent. These gases and vapors may be carried through a condensing apparatus, hydraulic seal and the like by means of which the heavier components, tars, etc., are removed. If desired the products may be passed through scrubbers or compressors to remove the heavier constituents which are not so easily condensed in the previous stage of condensation. Thus by these condensation steps light oils are obtained which may be rectified to yield gasoline or motor spirit.

In one form of the invention the residual gases and vapors may be then subjected to a purification process to remove sulphur compounds or to remove any other undesirable constituents in case these be present. Such gases and vapors contain a substantial percentage of propylene and butylene and analogous olefins and are well adapted for catalytic oxidation by treatment with air and contacting with catalytic material. The gases and vapors therefore are mixed with air and are introduced into a catalytic chamber where the mixture is brought into contact with a catalyzer such as a spiral of copper gauze or brass, iron or any other suitable catalytic material in the form of the metal as for example pieces of wire gauze or fragments of the metal. As a substantial evolution of heat occurs on oxidation the use of a metal catalyzer for oxidizing compounds having the high heat of combustion characteristic of petroleum hydrocarbons affords a desirable means of conducting away excess heat. Since the regulation of temperature, especially prevention of too high a temperature is quite important in the oxidation of petroleum the application of a fragmental catalytic mass of metal or material having the heat conductivity of metal is a desirable means of assisting in the important factor of temperature control.

Compounds such as copper or chromium oxide, iron vanadate, silver chromate, molybdenum compounds and the like also may be used. A composite catalyzer consisting of two elements having more than one stage of oxidation as for example iron and vanadium or chromium affords a desirable catalytic body. Thus if fragments of iron are coated with chromium oxide or vanadium oxide or mixtures of these oxides the oxidizing effect of the composite catalyzer is obtained with the heat conductivity of a metallic base. It is also possible to support the catalyzer on any other suitable carrier if desired. For example in small apparatus where the heat evolution is not so important a factor pumice may be used. Such substantially non-conducting carriers may also be used in larger apparatus if suitable provision is made to absorb any excess heat.

For example a mixture of the gas thus obtained by cracking and containing a substantial percentage of olefins is mixed with air in quantity somewhat in excess of that required to oxidize the olefins to form for example, ketones and the mixture is passed over a spiral of copper gauze which is maintained at a temperature just below a low red heat. An incipient or low red heat is about 500° to 525° C. and I preferably do not permit the temperature to exceed 525° C. Preferably a black heat is employed just below a low red heat or in the neighborhood of 400° to 500° C. In some cases a temperature of below 400°, as for example, between 200 and 400° may be employed. By using pressures of several atmospheres above atmospheric pressure lower temperatures may be employed to advantage. As for example at a pressure of 10 atmospheres a temperature of 200° to 300° C. may be used in some cases. The products issuing from the catalytic chamber may be directly passed into water or may be first passed through a condenser and any condensable material first removed, thus any steam formed by the oxidation or present in the incoming air may be condensed and carry with it various water soluble products. Hydrocarbons also may condense and separate above the water layer. Steam may be used to control the temperature in the catalytic mass or when no catalyzer is employed as a means of preventing too violent reaction or explosion. The steam may however be omitted. In any event any water which has formed by the combustion may be collected to some extent at least by suitable condensation. Or the products from the catalytic or oxidation chamber may pass into water and the water soluble substances thus collected. The residual gases may be passed into an oil scrubber or silica gel if desired. Or water washing may be a second stage of operation or omitted entirely, oil scrubbing or silica gel being used. Activated carbon may be used as an absorbing agent.

In the aqueous solution from the oxidation will be found the alcohols, ketones, aldehydes, acids, quinones and other water soluble products of oxidation which may be formed. These will vary with different conditions of operation and nature of the raw material.

In the present invention, in one phase at least, it is an object to utilize kerosene hydrocarbons the major portion of which boil substantially below 250° or 300° C. Kerosene is readily vaporized and is suitable for this phase of the invention. Any petroleum hydrocarbon which is readily vaporizable and boils below 300° C. may be used in carrying out this phase of the invention.

In employing kerosene, first purified by means of a desulphurizing agent, it may for example be passed through a heated tube or cracked under pressure to produce gasoline and gases. The gasoline is suitably collected and the gases employed for the oxidation. Or the gasoline may be vaporized, admixed with air and submitted to oxidation. In the first procedure the kerosene may be passed through a heated tube at a temperature of 500° to 700° C. The products may be then passed through a condenser, the light portions submitted to catalytic oxidation or the entire mixture of cracked products may be passed through the catalytic mass in admixture with air or an oxygen-containing gas. All the air may be added at once or if desired the air may be added at intervals within the catalytic mass. The air may be preheated by passing it about the catalytic chamber or the receptacle in which oxidation is in progress.

The regeneration of the heat developed in the operation is desirable and it is not necessary in all cases to utilize the heat for the purpose of preheating the incoming air or the incoming mixture of air and hydrocarbon vapors or gases. The heat may be utilized in other ways. The temperature may be kept below a low red heat or incipient red heat, that is below approximately 500° C. through the introduction of a lesser quantity of air than that which would serve to oxidize the entire body of hydrocarbons to alcohols, aldehydes, ketones, organic acids or whatever particular product was desired. The use of a quantity of air sufficient only to oxidize a minor portion of the hydrocarbons to the organic derivative desired is a feature of the present invention. If for example the gases and vapors are rich in olefins containing say ten to twenty per cent or more a quantity of air or oxygen or other oxygen-containing gas may be introduced which will provide the oxygen necessary to oxidize the olefins to for example acetic acid. On the other hand if dibasic acids such as oxalic, succinic, malic or maleic acids and the like are desired the oxygen is proportioned accordingly, keeping in mind the desirability of having always an excess of hydrocarbon in the exit gases and vapors. Preferably in these exit products I prefer to have present a very substantial proportion of hydrocarbons in a substantially unoxidized condition. Preferably such proportion is at least fifty per cent of the total products calculated as hydrocarbons and organic bodies containing oxygen. This does not include the carbon monoxide, carbon dioxide, water etc.

In the case of vapors or gases which are free from olefins as for example still gases, the olefins of which have been scrubbed in some manner to remove the olefins, the same proportions hold with respect to the amount of oxygen to be employed. The oxidation to be carried out is so that an abundance of hydrocarbon is present in the exit gases and vapors.

The oxidation of kerosene as referred to above carried out in this manner employing a catalyzer of vanadium oxide and a temperature of 300° to 400° C. yields aldehydes and fatty acids. A small amount of formaldehyde is produced and higher aldehydes. The treatment of the aqueous solution containing aldehydes and acids is preferably as follows: If the aldehyde is desired in the free state the solution is rendered neutral with caustic soda and distilled with steam. The aldehyde is carried over and the aqueous solution becomes practically odorless. The higher aldehydes may be employed in various ways for example they may be made to react with caustic soda to form a resinous substance. In one case a resin of this sort was produced from kerosene and was obtained in the form of a light brown powder which could be melted to a resinous substance. The aldehydes also apparently polymerize during the oxidizing operation to some extent.

The neutral solution containing the salts of organic acid may be rendered very slightly acid with sulphuric or phosphoric acid and the organic acids distilled. In the case of the kerosene treatment referred to above a mixture of organic acids was obtained which were volatile with steam. These evidently consisted largely of propionic, butyric acids etc. On blowing a strong current of steam through the aqueous solution the distillate was acid. Acids were separated readily in this way or by distillation without steam. Hydroxy or dibasic acid, if formed, may be used for such operations as bleaching in substitution for oxalic acid etc. or may find uses in food products where an organic acid is desired to give a degree of acidity comparable with citric acid as for example in making various beverages, syrups etc.

In some cases the catalyzer may be omitted the mixture of oil vapor and air with or without steam being passed through a heated tube the walls of which are substantially without catalytic effect. The temperature is maintained below a red heat which avoids igniting conditions besides prevents violent combustion or explosion. Temperatures of a red heat or a bright red heat such as have heretofore been recommended are highly destructive to the products of oxidation and in the present invention are not used it being necessary to maintain the temperature below a low red heat. If the gaseous mixture is heated to a point slightly below the ignition temperature valuable oxidation reactions progress even though a catalytic substance is not present.

In one phase of the invention the oxidation of the propyl group of immediate higher hydrocarbon groups such as butyl, amyl and the like is especially considered. When petroleum oils are subjected to heat decomposition a substantial proportion of propyl groups are rendered available by such cracking treatment. It was commonly supposed that the "break-down" yielded ethylene, methane and the like in very large degree but it appears that the propyl group is one of unusual stability and therefore is found in the products of cracking in the form of propylene, propane or hydrocarbons readily yielding the propyl group to oxidizing action. The oxidation may go and does go to a further stage that of producing propionic acid, butyric acid and the like so that the invention is also concerned with producing fatty acids higher in the series than acetic acid but more especially the lower fatty acids above acetic which are readily volatile or easily volatilized with steam. These fatty acids are of value in producing flavoring compounds, artificial fruit essences and the like and from petroleum oil by means of the process described above esterified products have been obtained which have desirable fruity odors.

For example by neutralizing the acid water solution obtained by the oxidation of kerosene and distilling, aldehydes were separated which were capable of polymerization or condensation. In the residue after removal of aldehydes the salts of the organic acids were obtained. Thus compounds resembling sodium propionate and butyrate were derived and heated with ethyl alcohol and sulphuric acid producing a very agreeable odor somewhat suggestive of pears or pineapple but not distinctly the odor of either one.

The present invention therefore is concerned in one aspect, with the cracking of petroleum oils to liberate propyl groups or immediate higher homologues in a very available form for air oxidation and converting such available groups into propionic and higher fatty acids and other bodies mentioned.

The present invention thus opens the way of the petroleum refiner to produce fatty acids from petroleum which on esterification yield esters having promising applications as artificial fruit flavors, in perfumes and in other fields heretofore remote from the petroleum industry.

Methods are already known by means of which, alcohols:—e. g. ethyl, propyl, butyl, amyl alcohols are prepared from still gases; such methods having as the basis, the use of sulphuric acid as an absorbing agent.

The petroleum refiner thus may produce alcohols on the one hand and fatty acids on the other and by suitable combination prepare at a relatively low cost a variety of esters heretofore quite costly.

The absorption method involving the use of sulphuric acid to which I have referred does not form any part of the present invention.

What I claim is:—

1. In the process including oxidation of kerosene oil by treatment with an oxygen-containing gas at a temperature below a red heat under conditions to produce substantial oxidation and collection of the oxidized products, the step of using an amount of oxygen sufficient to oxidize only a minor portion of the hydrocarbons of said kerosene oil.

2. In the process of oxidizing petroleum oil by treatment with an oxygen-containing gas at a temperature below a red heat under conditions to produce substantial oxidation, the step of using an amount of oxygen sufficient to oxidize only a minor portion of the hydrocarbons of said petroleum oil.

3. In the process of oxidizing a desulphurized petroleum oil with an oxygen-containing gas at a temperature below a red heat under conditions to produce substantial oxidation, the step of using an amount of oxygen sufficient to oxidize only a minor portion of the hydrocarbons of said desulphurized petroleum oil.

4. In the process of oxidizing a desulphurized kerosene oil by treatment with an oxygen-containing gas at a temperature below a red heat under conditions to produce substantial oxidation, the step of using an amount of oxygen sufficient to oxidize only a minor portion of the hydrocarbons of said desulphurized kerosene oil.

5. In the process of oxidizing a desulphurized petroleum oil boiling below 300° C. by treatment with an oxygen-containing gas at a temperature below a red heat under conditions to produce substantial oxidation, the step of using an amount of oxygen sufficient to oxidize only a minor portion of said desulphurized petroleum oil.

6. In the process of making an aldehyde by treating kerosene vapors and air at a temperature below a red heat in the presence of a catalytic mass under conditions to produce substantial oxidation followed by collecting the aldehyde produced by oxidation, the step of using in the treatment process, an amount of oxygen sufficient to oxidize only a minor portion of the hydrocarbon contained in said kerosene vapors.

7. In the process of making an aldehyde by treating petroleum vapors and air at a temperature below a red heat in the presence of a catalyst under conditions to produce substantial oxidation followed by collecting the aldehyde produced by oxidation, the step of using an amount of oxygen sufficient to oxidize only a minor portion of the hydrocarbons contained in the petroleum vapors.

8. In the process of making aldehydes and acids by treating vapors from desulphurized petroleum and air in the presence of a catalyst at a temperature below a red heat under conditions to produce substantial oxidation, followed by collecting the aldehydes and acids produced by oxidation, the step of using an amount of oxygen sufficient to oxidize only a minor portion of the hydrocarbons contained in the petroleum vapors.

9. In the process of making aldehydes and aldehyde polymers by treating vapors from petroleum boiling below 300° C. and air in the presence of a catalyst at a temperature below a low red heat under conditions to produce substantial oxidation, the step of using an amount of oxygen sufficient to oxidize only a minor portion of the hydrocarbons of such petroleum vapors, and then collecting the aldehyde produced by oxidation.

10. In the process of oxidizing a petroleum oil boiling below 300° C. by treatment with oxygen at a temperature below a low red heat under conditions to produce substantial oxidation, the step of using an amount of oxygen sufficient to oxidize only a minor portion of the hydrocarbons of said petroleum oil, and then collecting the oxidized products.

11. In the process of oxidizing a petroleum oil boiling below 300° C. with air at a temperature below a low red heat under conditions to produce substantial oxidation followed by collecting the oxidized products, the step of using an amount of oxygen sufficient to oxidize only a minor portion of the hydrocarbons contained in said petroleum oil.

12. In the process of oxidizing a petroleum oil by treatment with an oxygen-containing gas at a temperature between 400 and 500° C. under conditions to produce substantial oxidation, the step of using an amount of oxygen sufficient to oxidize only a minor portion of the hydrocarbons of the petroleum oil.

13. In the process of oxidizing petroleum oil by treatment with an oxygen-containing gas at a temperature below a red heat under conditions to produce substantial oxidation, while withdrawing heat from the oxidation zone, the step of using an amount of oxygen sufficient to oxidize only a minor portion of the hydrocarbons of said petroleum oil.

14. In the process of oxidizing petroleum oil by treatment with an oxygen-containing gas at a temperature below a red heat under conditions to produce substantial oxidation, the step of using an amount of oxygen sufficient to oxidize only a minor portion of the hydrocarbons of the petroleum oil whereby at least 50% of hydrocarbons are left in the end products calculated as hydrocarbons and organic bodies containing oxygen, exclusive of the carbon monoxide, carbon dioxide, and water present in the end products.

15. In the process including oxidation of petroleum oil by treatment with an oxygen-containing gas at a temperature below a red heat and at super-atmospheric pressure under conditions to produce substantial oxidation, the step of using an amount of oxygen sufficient to oxidize only a minor portion of said petroleum oil.

CARLETON ELLIS.